Patented Jan. 7, 1936

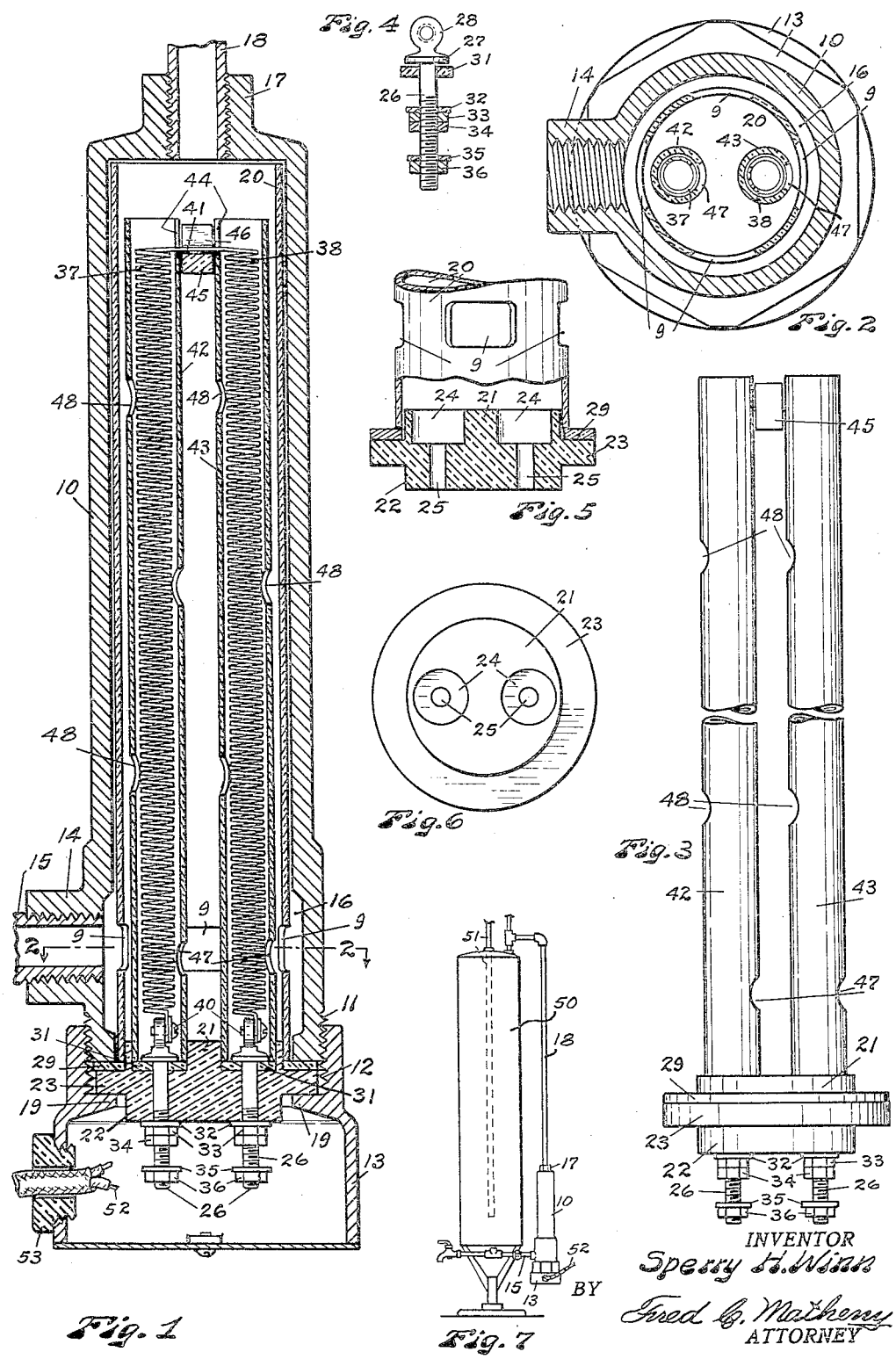

2,026,809

UNITED STATES PATENT OFFICE 2,026,809

ELECTRIC WATER HEATER

Sperry H. Winn, Seattle, Wash.

Application November 20, 1933, Serial No. 698,825

12 Claims. (Cl. 219—39)

My invention relates to electric water heaters of the type in which the water is brought into direct contact with the electric heating element and the general object of my invention is to provide an electric water heater of this type which is simple and inexpensive in construction and highly efficient in operation.

Another object of the invention is to provide an electric heater in which all of the insulating parts are made of a phenolitic condensation product, one suitable form of which may be the product commonly known by the trade name of "Bakelite," which has high insulating qualities, is substantially non-absorbent, is durable in use and is highly resistant to breakage.

Another object of the invention is to provide an electric water heater of this nature in which the bottom of the heating chamber is formed of a phenolitic condensation product base plate and in which the terminal posts enter the water heating chamber through this phenolitic condensation product base plate and are thus effectively insulated against grounding or short circuiting, and to further provide efficient means for clamping and holding said phenolitic condensation product base plate member in such a manner that it forms a liquid tight connection with the housing and at the same time is easily removable for the purpose of replacement and repair.

Another object is to provide simple and efficient assembly means for the heating elements and to provide efficient means for insulating said heating elements against leakage of current, short circuiting and grounding.

Other and more specific objects of the invention will be apparent from the following description taken in connection with the accompanying drawing.

In the drawing Figure 1 is a view in vertical section of an electric water heater constructed in accordance with my invention.

Fig. 2 is a cross section of the same substantially on broken line 2—2 of Fig. 1.

Fig. 3 is a detached view in elevation of the heating unit assembly.

Fig. 4 is a detached elevation of a terminal post embodied in the invention.

Fig. 5 is a detached view partly in elevation and partly in cross section showing a heating unit base of insulating material and showing a tubular lining of insulating material positioned on said base, parts of said tubular lining being broken away.

Fig. 6 is a top plan view of the heating unit base.

Fig. 7 is an elevation on a reduced scale illustrating an installation of my electric water heater in connection with an ordinary domestic hot water tank.

Referring to the drawing, the numeral 10 designates a tubular housing constructed with an open bottom end and provided around this bottom end with an external thread 11 for the reception of an internally threaded portion 12 of a housing base 13. An inwardly directed clamping flange 19 is provided in the housing base 13. An internally threaded tubular boss 14 is provided on one side of the housing 10 adjacent the bottom end thereof for connection with a water inlet pipe 15. An annular water circulation space 16 is provided in the lower end portion of the housing 10 in registration with the tubular boss 14. This annular water circulation space is formed by providing a section of enlarged diameter within the housing said enlarged section terminating short of the bottom end of the housing. The upper end of the housing 10 is partially closed and is provided with an internally threaded axial tubular boss 17 for connection with a water outlet pipe 18. The exterior of the boss 17 is preferably hexagonal whereby a wrench may be placed thereon.

A phenolitic condensation product tube 20 of slightly smaller diameter than the interior of the housing 10 is disposed to fit snugly within said housing and is freely removable and insertable in the housing when the housing base 13 is removed. This tube 20 forms an insulating lining which fits the housing snugly except at the location of the enlarged water circulation space 16. At the location of this water circulation space 16 the lining tube 20 is provided with a plurality of openings 9 in the walls thereof through which the water is free to enter in evenly distributed relation around the liner tube 20.

The electric heating unit assembly comprises a circular integral base plate, of insulating material, as phenolitic condensation product, to which the heating elements and terminal posts are secured. This base plate has an upwardly extending boss portion 21 and a downwardly extending boss portion 22 and an annular flange 23. The upwardly extending boss portion 21 has two larger recesses 24 extending from the top downwardly and these recesses 24 are intersected by two smaller holes 25 which extend from the bottom of the lower boss portion 22 upwardly and are centrally positioned as respects the recesses 24.

The holes in the base plate formed by recesses 24 and holes 25 are adapted to receive binding posts 26. These binding posts 26 are preferably each provided at the upper end with an integral annular head portion 27 and an eye portion 28. The binding posts are inserted in the base plate with the heads 27 positioned in the recesses 24 and the posts 26 extending down through the holes 25. Packing washers 31 are provided between the heads 27 of the binding posts and the bottoms of the recesses 24 to prevent leakage around the binding posts 26. On the lower end of each binding post 26 I preferably provide tightening means which maybe in the nature of a washer 32, a nut 33, and a jam nut 34. Another washer 35 and nut 36 are provided for holding the wires 52 through which current is supplied.

Two heating coils 37 and 38 are electrically connected with the respective binding posts 26, preferably by screws 40 which screw into threaded holes in the eye members 28. The two heating coils 37 and 38 are preferably formed of a single piece of high resistance wire and are electrically connected with each other at their upper ends as by a straight wire section 41 whereby said two coils will be electrically connected in series. The heating coils 37 and 38 are housed within tubes 42 and 43 respectively, of insulating material, as phenolitic condensation product. The lower ends of these tubes 42 and 43 are positioned within the recesses 24 whereby the tubes are held in an upright position, as shown in Figs. 1 and 2. The upper ends of the tubes 42 and 43 are slotted longitudinally from the top down for a short distance as shown at 44 and the straight section 41 of heating element wire lies within these slots at the location where it passes from one insulating tube to the other. A spacer member 45 of insulating material is provided between the upper ends of the tubes 42 and 43. This spacer 45 is preferably split as at 46 and the element wire section 41 passes through this split whereby the spacer member 45 will be supported by the element wire section 41. The split 46 makes it possible to slip the spacer 45 over the wire section 41 and said split 46 is preferably narrow enough so that the spacer 45 will not drop off of the wire 41 after it has been placed thereon. The heating element coils 37 and 38, as originally wound, are of shorter length than the insulation tubes 42 and 43 and said coils are made of resilient wire whereby the said heating coils act as tension springs to urge the tubes 42 and 43 down in the recesses 24, thus helping to hold said tubes 42 and 43 in upright position. This also leaves the tubes 42 and 43 loosely supported so that they may be readily lifted up to afford access to the screws 40. This construction is important, as it facilitates speed and ease of assembly of the device and provides a construction which can not be damaged by expansion and contraction. The tubes 42 and 43 have holes 47 in their walls adjacent their lower ends and other holes 48 in their walls at spaced intervals above the holes 47 whereby the water may enter into the tubes and pass upwardly in the tubes in direct contact with the heating coils. It will be noted that the lowermost holes 47 are positioned at a substantial distance above the top side of the base plate member 21 so that if any sediment collects in the bottom of the heater it will not enter the holes 47 and there will be substantially no danger of sediment short circuiting the heating coil or forming a short circuit between the two terminal posts. By providing holes 48 at intervals throughout the length of the tubes 42 and 43 I make it possible for water to enter these tubes at various points and thereby secure a higher efficiency, avoid overheating small portions of the water, heat the entire body of water more evenly and safeguard the heating coils from being overheated. If water could not enter at a plurality of different elevations then all of the water entering through the bottom holes 47 would have to traverse the entire length of the tubes without being mixed with any cooler water and might be heated much hotter than is necessary and the heating elements might be subjected to a higher temperature than is required for satisfactory operation.

The heating coils 37 and 38 together with the base and terminal posts and tubes 42 and 43 form a unitary assembly which is insertable into and removable from the housing as a unit when the housing base 13 is removed. When the heater is assembled, as shown in Fig. 1, the circular flange portion 23 of the heating unit base is securely clamped between the bottom end of the housing 10 and an internal flange 19 in the housing base 13. A gasket 29 which rests on top of the flange 19 and is engaged by the lower end of the housing 10 forms a water tight seal and prevents leakage between the insulating base plate and the lower end of the housing.

The upper portion 14 of the housing base 13 being of hexagonal shape externally, may readily be engaged by a wrench for the purpose of screwing the base onto or off of the housing. This makes is possible to easily dis-assemble the heater without danger of breaking the housing even though the threads 11 and 12 have not been relatively moved for a long period of time.

In the installation of this water heater in connection with an ordinary domestic hot water tank 50 the heater is preferably positioned so that the lower end of the water circulation chamber in the heater is level with or below the bottom end of the hot water tank as shown in Fig. 7. The water inlet pipe 15 at the lower end of the water heater is connected with the lower portion of the hot water tank and the water outlet pipe 16 from the upper end of the water heater is connected with the upper portion of the hot water tank. When thus installed, cold water which is delivered through a pipe 51 to the lower portion of the hot water tank 50 will flow into the heater through the pipe 15 and will then pass upwardly through the heater and be heated and will then be delivered by the pipe 16 into the top end of the hot water tank from which it may be drawn off in the usual manner.

In passing upwardly through the water heater a portion of the water comes into direct contact with the heating elements in its upward travel through the tubes 42 and 43 and the entire body of water is heated sufficiently for domestic purposes without being overheated. The efficiency of the heater is high in proportion to the amount of current consumed due to the direct contact of the water with the heating elements and the electrical losses in the heater are low due to the heating elements and terminal posts being very thoroughly insulated from the metal housing by the tubes 42 and 43 and the insulating lining 20 and the insulating base plate.

Circuit wires 52 which enter the housing base 13 through a fitting 53 may connect the terminal posts 26 with any suitable source of supply of electric current.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In an electric water heater of the class described; a tubular metal housing; a tubular phenolitic condensation product lining in said housing; a phenolitic condensation product base in said housing; two terminal posts extending through said base and relatively insulated by said base, electric water heating coils electrically connected between said terminal posts and phenolitic condensation product tubes enclosing said coils said phenolitic condensation product tubes having openings at intervals in the walls thereof.

2. In an electric water heater; a tubular metal housing; a phenolitic condensation product base having a liquid tight connection with the bottom of said housing; two terminal posts extending through said phenolitic condensation product base, two water heating coils in said housing connected in series between said terminal posts and extending upwardly from said base; a phenolitic condensation product tube enclosing each of said heating coils; water circulation openings in the walls of said tubes; a tubular phenolitic condensation product lining within said housing; and liquid circulating conduit means connected with said housing.

3. In an electric water heater; a tubular metal housing; a base of insulating material having a liquid tight connection with the bottom of said housing; two terminal posts extending through said base, two water heating coils in said housing connected in series between said terminal posts and extending upwardly from said base; a tube of insulating material enclosing each of said heating coils; water circulation openings in the walls of said tubes; a tubular lining of insulating material within said housing; and liquid circulating conduit means connected with said housing.

4. In an electric water heater; a tubular metal housing; a base of insulating material having a liquid tight connection with the bottom of said housing; two terminal posts extending through said base, two water heating coils in said housing connected in series between said terminal posts and extending upwardly from said base; two tubes of insulating material enclosing the respective coils and fitting over the upper ends of said terminal posts; each tube having a water circulation opening positioned a substantial distance above the top end of the enclosed terminal post; and liquid circulation means connected with said housing.

5. In an electric water heater; a tubular metal housing; a base of insulating material having a liquid tight connection with the bottom portion of said housing, said base having two recesses formed in the top side thereof; two terminal posts extending upwardly through said base and having upper end portions positioned in said recesses; two upright heating coils within said housing electrically connected in series between said terminal posts, two tubes of insulating material enclosing the respective heating coils and having their lower ends positioned in said recesses and enclosing the upper ends of said terminal posts, said tubes having water circulation openings in the walls thereof; and liquid circulation conduit means connected with said housing.

6. In an electric water heater; a tubular metal housing; a base of insulating material having a liquid tight connection with the bottom portion of said housing, said base having two recesses formed in the top side thereof; two terminal posts extending upwardly through said base and having upper end portions positioned in said recesses; two upright heating coils within said housing electrically connected in series between said terminal posts, two tubes of insulating material enclosing the respective heating coils and having their lower ends positioned in said recesses and enclosing the upper ends of said terminal posts whereby said tubes are supported in upright position and said terminal posts are protected from sediment deposits, said tubes having water circulation openings provided in the walls thereof above said terminal posts; a tubular lining of insulating material within said housing surrounding said tubes and said heating coils; and liquid circulation conduit means connected with said housing.

7. In a direct contact electric water heater; a housing having liquid circulation means connected therewith; and an electric water heating unit of the direct contact type in said housing, said electric water heating unit embodying a base having two recesses in the upper side thereof, two perforated tubes of insulating material having their lower ends positioned in said recesses whereby they are loosely supported in substantially parallel upright relation, two terminal posts extending upwardly through the base and into the bottom ends of said tubes, two helical wire heating coils in said tubes, said coils being electrically connected with each other and mechanically connected with said tubes at their upper ends and being electrically and mechanically connected with said terminal posts at their lower ends and being under tension whereby said tubes are yieldingly held in engagement with said base.

8. In a direct contact electric water heater; a housing having liquid circulation means connected therewith; and an electric water heating unit of the direct contact type in said housing, said electric water heating unit embodying a base having two recesses in the upper side thereof, two tubes of insulating material having their lower ends positioned in said recesses whereby they are loosely supported in substantially parallel upright relation said tubes having water circulation openings therein, two terminal posts extending upwardly through the base and into the bottom ends of said tubes, two resilient helical wire heating coils in said tubes the lower ends of said coils being electrically and mechanically connected with said terminal posts, notches in the upper ends of said tubes, a spacer between the upper ends of said tubes and a section of conductor wire extending crosswise between said tubes through said notches and said spacer, said heating coils being under tension whereby said tubes are yieldingly held in engagement with said base.

9. In an electric water heater; a tubular housing having a portion of enlarged internal diameter adjacent the lower end, a tubular lining of insulating material of substantially the same length and slightly smaller diameter than said housing disposed in said housing and leaving an annular water circulation space around said lining at the location of the enlarged internal portion of said housing, said lining having openings in the walls thereof in registration with the enlarged internal portion of said housing; water inlet means communicating with the enlarged internal portion of said housing; water outlet means communicating with the upper portion of said housing; and electric water heating means in said housing.

10. In an electric water heater of the class described; a tubular metal housing having a portion of enlarged internal diameter adjacent the lower end; a housing base adapted to screw onto the bottom end of said housing, an internal annular flange in said housing base; a tubular cylindrical insulating lining of slightly smaller diameter than said housing disposed in said housing, said lining having holes in its walls adjacent the lower end; fluid inlet conduit means connected with the lower end portion of said housing; fluid outlet conduit means connected with the upper end portion of said housing; an insulating base having an annular flange portion adapted to be clamped between the bottom end of said housing and the flange of said housing base, two terminal posts extending through said base; two heating coils electrically connected with said terminal posts; and tubes of insulating material enclosing said heating coils, said tubes having openings at intervals in the walls thereof.

11. In an electric water heater of the class described; a tubular metal housing having a portion of enlarged internal diameter adjacent the lower end; external threads on the bottom end of said housing; a housing base having internal threads adapted to screw onto the bottom end of said housing; an internal annular flange in said housing base; a tubular cylindrical phenolitic condensation product lining adapted to fit snugly within said housing, said lining having holes therein at the location of the enlarged internal portion of said housing; fluid inlet conduit means connected with the lower end portion of said housing; fluid outlet conduit means connected with the upper end portion of said housing; a phenolitic condensation product base having an annular flange portion adapted to be clamped between the bottom end of said housing and the flange of said housing base, two terminal posts extending through said base; two heating coils in said housing electrically connected in series with said terminal posts and phenolitic condensation product tubes enclosing said heating coils, said phenolitic condensation product tubes having openings at intervals in the walls thereof.

12. In an electric water heater; a tubular metal housing having an open bottom end; a housing base adapted to screw onto the bottom end of said housing; an internal annular flange in said housing base; a base plate of insulating material closing the bottom end of said housing, said base plate having a centrally positioned boss of smaller diameter than said housing projecting upwardly into said housing and leaving an annular space between said boss and the housing wall and said base plate having a flange portion clamped between the bottom end of the housing and the internal flange of the housing base; a tubular lining of insulating material disposed within said housing with its bottom end positioned in the annular space formed between said boss and said housing, said lining having openings in the walls thereof adjacent the lower end; electric water heating elements mounted on said base plate and positioned in said housing; and water circulation means connected with said housing.

SPERRY H. WINN.